United States Patent [19]

Lawrence

[11] 3,853,095
[45] Dec. 10, 1974

[54] ARTIFICIAL CULTCH FOR OYSTERS

[76] Inventor: Kenneth George Lawrence, 1734 Harper Dr., Prince George, British Columbia, Canada

[22] Filed: June 15, 1973

[21] Appl. No.: 370,368

[52] U.S. Cl. .................................................. 119/4
[51] Int. Cl. ............................................ A01k 61/00
[58] Field of Search ......... 119/4; 425/127, 203, 808

[56] References Cited
UNITED STATES PATENTS

| 3,294,062 | 12/1966 | Hanks | 119/4 |
| 3,353,220 | 11/1967 | Lenoble | 425/808 UX |
| 3,741,159 | 6/1973 | Halaunbrenner | 119/4 |

FOREIGN PATENTS OR APPLICATIONS

| 1,174,670 | 5/1959 | France | 119/4 |

Primary Examiner—Hugh R. Chamblee
Attorney, Agent, or Firm—Carver and Company

[57] ABSTRACT

Artificial oyster cultch for use in assembly of similar cultches providing large spat collecting surface area for given volume. Cultch has base with bore and grid of intersecting ridges on at least one face, sloping sidewall of ridges defining recesses which serve as shallow moulds. Cultches spaced apart by spacers having bores, rope threaded through aligned bores of bases and spaces to tie cultches together to form assembly. Recesses coated with cement grout to form flakes which are retained in recesses, coated cultch then floated in spat collecting water. When spat has grown to required size, cultch is removed from water and deformed to separate flakes from recesses. Flakes then distributed in water to permit spat to mature to oyster.

12 Claims, 8 Drawing Figures

PATENTED DEC 10 1974

ARTIFICIAL CULTCH FOR OYSTERS

BACKGROUND OF THE INVENTION

1. Field of the Invention

The invention relates to an artificial oyster cultch for collecting oyster spat.

2. Prior Art

A cultch is material used for collection of oyster spat, that is material provided for the attachment of larval oysters. To collect oyster spat, the cultch is placed in the water at an appropriate time and after the spat have attached themselves to the cultch they are usually allowed to grow for a time before dispersal in permanent growing areas. Spat tends to collect on the cultch at too high a density for effective growth of the larvae to mature oysters and thus, before dispersal in the permanent growing area, the cultch is broken into small pieces to improve dispersal to provide more room for the mature oysters to grow. This reducing overcrowding and results in improved formation of oysters. Old oyster shells are commonly used as a cultch and when the cultch is broken up often there is a considerable loss of young oysters due to the force required in breaking up the shell, i.e., larval oyster mortality is high.

Artificial cultches are known, and fairly successful examples include cement-coated wood veneer or cement-coated cardboard eggcrate fillers, the latter being normally used to separate domestic eggs. The artificial cultches above are all characterized by relatively low surface area for a given volume of sea water containing oyster seed. Also it is difficult to produce a cultch having sufficient strength to withstand the rough handling whilst being set in the sea, and yet being sufficiently weak to break up easily when it is required to separate the spat. Also, if such cultches are fouled before attachment of spat the cultches have to be scrapped because they cannot be easily cleaned or recoated with cement. A further disadvantage is that assembly and coating of such cultches involve much labour.

SUMMARY OF THE INVENTION

The invention reduces difficulties of prior art cultches by providing a cultch which can be assembled to form a cultch assembly having a relatively high surface area per unit volume of cultch thus improving utilization of water containing spat. Also the cultch is tough enough to withstand normal rough handling whilst setting the cultches, and yet larvae can be easily separated, with relatively low larval mortality. Furthermore the cultch is a cement-coated type which, after separation of cement flakes to which the larvae are attached, the cultch can be re-coated with cement and re-used without dismantling the assembly. The cultch is adaptable for use in a raft suspension, or for use in intertidal racks, and is easily assembled to a required size dependent on the location.

An artificial cultch according to the invention includes a generally plane, flexible base having first and second faces, the base having a bore to accept a connecting member for attaching the cultch to other cultches to form an assembly of cultches. The first face of the base has a grid of intersecting ridges, the ridges having side walls to define in part and enclose a plurality of recesses. The ridges extend outwardly from the face of the base a distance defining depth of the recesses. When the cultch is coated with a cement grout the recesses retain the grout to form a plurality of frangible cement grout flakes on which the oyster spat is to collect.

A detailed description following related to drawings, describes preferred embodiment of the invention, which however is capable of expression in structure other than that particularly described and illustrated.

DETAILED DISCLOSURE

FIG. 1

Figure 1:
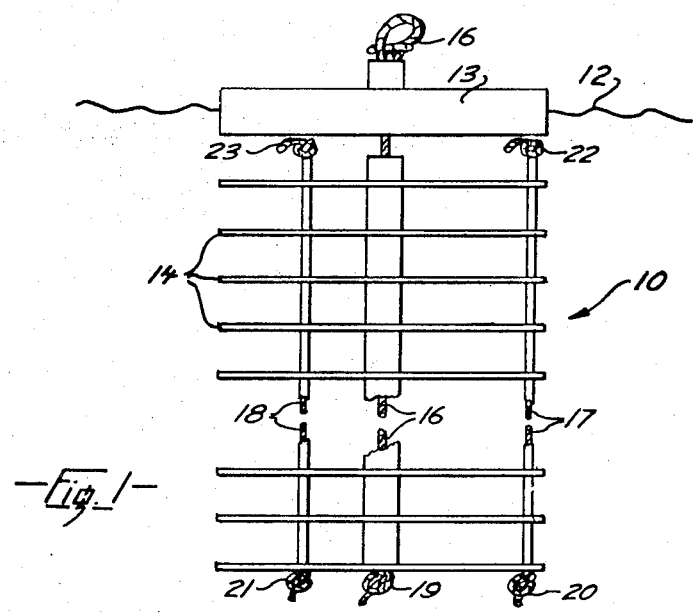
FIG. 1 is a fragmented side elevation of an assembly of cultches according to the invention.

A cultch assembly 10 according to the invention is shown floating just beneath surface 12 of the sea. The assembly has a plurality of similar cultches 14 secured together, the assembly being denser than water and thus requires support by a float 13. Similar cultch assemblies (not shown) are tied together at the floats to form a raft. The cultches are made from a plastic which is flexible but has a resiliency to maintain shape. A suitable plastic is polyethylene.

A rope 16 passes through a bore (not shown) in the base and serves as a connecting member connecting central portions of the cultches together to form the assembly. Similar ropes 17 and 18 pass through peripheral bores (not shown) adjacent periphery of the base. Knots 19, 20 and 21 at lower ends of the ropes prevent the cultch assembly from sliding off the ropes. The ropes 17 and 18 have knots 22 and 23 at upper ends thereof, thus restraining the periphery of the cultch from excessive deformation or warping.

Figure 2:
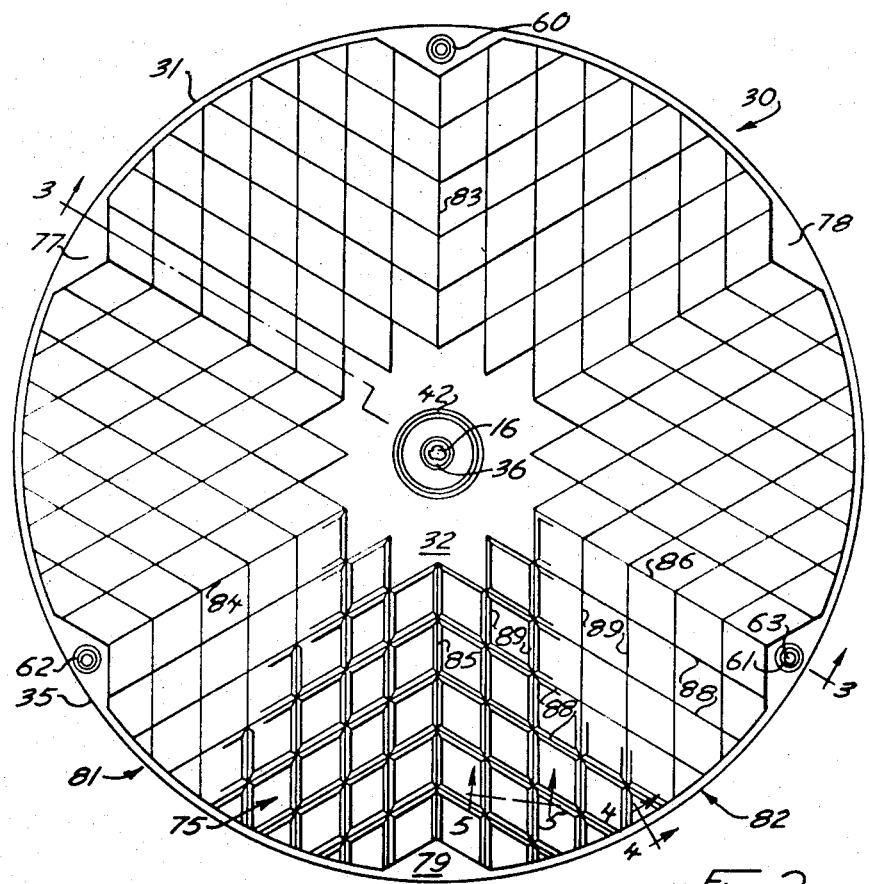
FIG. 2 is a top plan of one cultch.
Figure 3:
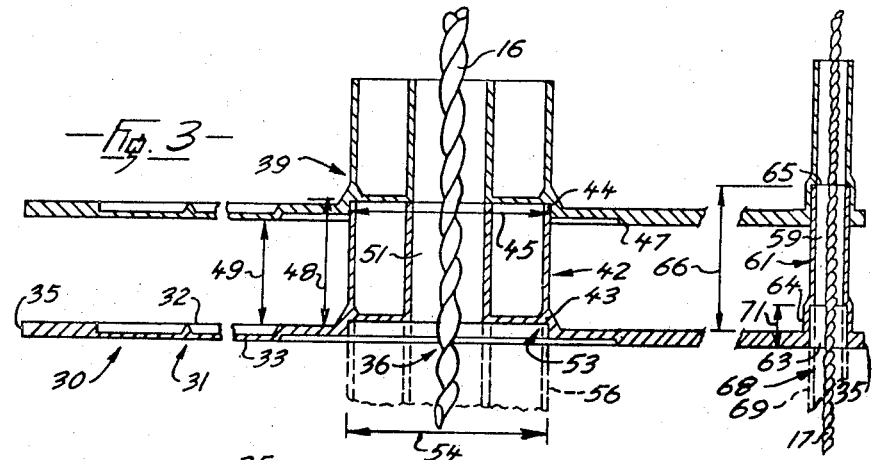
FIG. 3 is a simplified fragmented section on 3—3 of FIG. 2.

FIGS. 2 and 3

With reference to FIG. 3, a typical cultch 30 has a base 31 having an upper or first face 32, and a second or lower face 33. The base has an edge 35 defining the periphery thereof, and a central bore 36 to accept the rope 16, the rope securing adjacent cultches together, a typical adjacent upper cultch 39 being shown in FIG. 3 positioned above the cultch 30.

A spacer 42 extends from the face 32, the spacer having inner and outer ends 43 and 44 respectively, the inner end being adjacent the first face. The spacer is a cylindrical projection having a longitudinal bore 51 aligned with the central bore 36 of the spacer, so that both bores accept the rope 16. The outer end 44 has a diameter 45 and is spaced a height 48 from the face 32. The spacer contacts an opposed second face 47 of the adjacent cultch 39 so as to maintain a separation 49 between bases of adjacent cultches when assembled.

A portion of the second face 33 adjacent the inner end 43 of the spacer has a complementary recess 53 having a diameter 54 sufficient to accept an outer end of a similar space of an adjacent lower cultch, the spacer of the adjacent lower cultch being designated 56 and shown in broken outline. The recess 53 thus has a depth equal to difference between the height 48 and the separation 49. Thus, when the bores of adjacent cultches are aligned, the outer end of the spacer of one cultch can engage a complementary recess of an adjacent cultch as shown in FIG. 3.

As seen in FIG. 2 a plurality of spaced peripheral spacers are provided adjacent the periphery of the base, three equally spaced spacers 60, 61 and 62 being shown. With reference to FIG. 3 the peripheral spacer 61 has a longitudinal bore 59 and inner and outer ends 64 and 65, the inner end being adjacent the second face 32 and the outer end being spaced a height 66 from the face 32. The base has a peripheral bore 63 aligned with the central bore 59 of the spacer 61, so that both bores accept the rope 17 threaded therethrough. A portion of the second face 33 adjacent the inner end of the spacer has a complementary recess 68 having a size sufficient to accept an outer end 69 of an adjacent spacer of the adjacent lower cultch, the end 69 being shown in broken outline. The complementary recess 68 has a depth 71 sufficient to accept a portion of the outer end of the adjacent peripheral spacer, the height 66 and depth of the recess being selected so that the separations between peripheries of adjacent cultches are approximately equal to the separation 49 adjacent the central spacer.

As seen in FIG. 2, the first face 32 of the base has a grid 75 of intersecting ridges, which grid can be divided into six equal sectors. Three radial ridges 83, 86 and 84 extend from the spacers 60, 61 and 62 respectively towards the spacer 42 to divide the base equally into three main 120° sectors. Each main sector has a boss provided at mid-points between the spacers, the bosses being designated 77, 78, and 79. Similar radial ridges extend from the bosses towards the spacer 42 to bisect the main 120° sectors forming six 60° sectors. Two adjacent 60° sectors 81 and 82 are defined in part by radial ridges 84, 85 and 86, the ridge 85 being common to both sectors and extending from the spacer 42 to the boss 79.

The sector 82 has a first set of spaced parallel ridges extending across the base parallel to the ridge 86, some ridges of the set being designated 88. The sector 82 has a second set of spaced parallel ridges extending across the base parallel to the ridge 85, some ridges of the second set being designated 89. The ridges of the first set intersect the ridges of the second set at 60°, thus forming a plurality of diamond-shaped recesses extending between the ridges 85 and 86 of the sector 82.

The sector 81 has two sets of similar ridges, one set being parallel to the ridge 85, the other set being parallel to the ridge 84 as shown, forming similarly a plurality of diamond-shaped recesses. The sector 81 is thus a mirror image about the ridge 85 of the sector 82. The above arrangement of ridges extends between the radial ridges which define boundaries of the remaining 60° sectors, and thus a plurality of diamond-shaped recesses extends across the upper face of the base. The ridges have side walls that are described in more detail with reference to FIG. 5.

FIG. 4

As previously stated the base has a periphery 35, which periphery has a peripheral rim 94 having a depth 95 equal to height of an upper edge 96 of the ridge 89. The rim 94 serves to protect the periphery of the cultch base from damage, and provides additional stiffening to reduce warpage. The peripheral spacers (not shown), when fitted into recesses of adjacent spacers also increase stiffness of the rim and reduce warping.

Figures 4, 5:
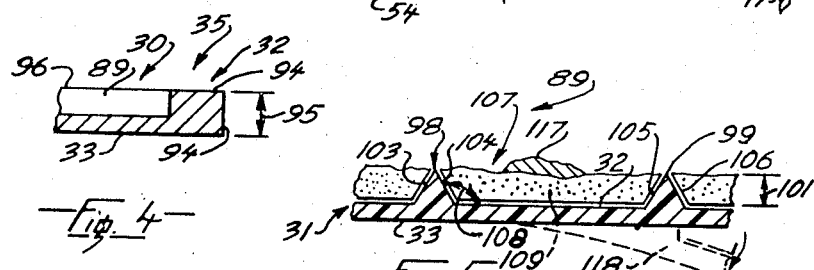
FIG. 4 is a fragmented section on 4—4 of FIG. 2.
FIG. 5 is a fragmented section on 5—5 of FIG. 2, after the cultch has been coated with cement grout.
Figure 6:
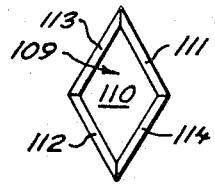
FIG. 6 is a plan of a cement grout flake produced by the cultch.
Figure 7:
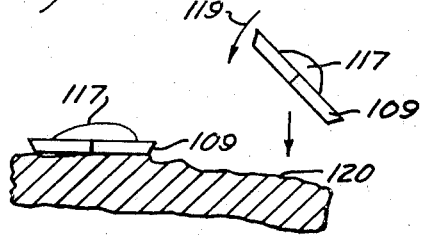
FIG. 7 is a sequence diagram of a cement grout flake with a larval oyster attached settling on sea bed.

FIGS. 5 through 7

As shown in FIG. 5, a typical pair of adjacent ridges 98 and 99 of the set of ridges 89 are shown extending outwardly from the face 32 of the base a distance 101 defining height of the ridge. The ridge 98 has upwardly and outwardly converging side walls 103 and 104 and the ridge 99 has similar side walls 105 and 106. A pair of the set of ridges 88 (not shown in FIG. 5) intersect the ridges 98 and 99 to define in part and enclose a diamond shaped recess 107. The recess is thus defined by two pairs of opposite, outwardly diverging side walls, namely the side walls 104 and 105 of the ridges 98 and 99 and a similar pair of sidewalls relating to the pair of the ridges 88. The sidewalls are inclined to the face at equal angles, an angle 108, about 120°, being shown between the face 104 and the base. The height 101 of the ridges therefore defines depth of the recess, which recess serves as a mold to contain cement grout to be described in operation of the invention. The ridges thus serve two main purposes, namely they define in part a mold and also promote adhesion of grout by serving as keys.

With reference also to FIG. 6, the cement grout in the recess 107 hardens to form a grout flake 109. The grout flake is diamond-shaped in plan and has an inner face 110 and an outer face, the outer face being larger than the inner face, the faces being essentially plane and parallel to each other. Four bevelled edges extend between the faces, two opposed bevelled edges 111 and 112 being complementary to the sidewalls 104 and 105 of the ridges, and two opposed bevelled edges 113 and 114 being complementary to corresponding opposite sidewall of the recess (not shown). The bevelled edges are inclined at about 120° to the inner face of the flake, i.e., at an angle equal to the angle 108 of FIG. 5.

OPERATION

Figure 8:
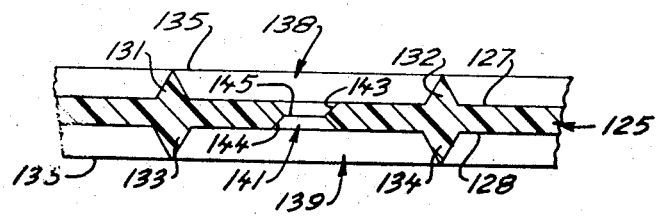
FIG. 8 is a simplified fragmented section through a base of an alternative cultch.

The plurality of cultches 14 are assembled into a cultch assembly 10, the float 13 and associated rope 16 being omitted. The cultches are thus joined together by three ropes passing through the peripheral spacers 60 through 62, two of the ropes only 17 and 18 being shown in FIG. 1. A cement grout is prepared, the grout being made from equal parts by volume of sand and cement. More sand can be added if required up to a maximum of about one part of cement to three parts of sand. Water is added until the grout has a thin consistency suitable for pouring in small holes, that is a consistency similar to a cementatious slurry. The grout is poured on to first surfaces of each cultch, the surfaces being inclined to shed excess grout so that the recesses are coated with cement grout up to upper edges of the ridges, the assembly then being set up so that the bases are horizontal to allow the grout to set. If the grout is applied in a thicker layer, i.e., thicker than the height 101, the ridges serve as a means to produce a weakness in the grout, thus facilitating breakage into the required diamond shaped flakes. Alternatively the cultch assemblies can be dipped in the grout or sprayed with grout. If the cement grout is to be poured on or sprayed on the cultch it is preferable to limit coating to upper faces of the base only, so as to reduce build up of grout on the lower face. Grout collecting on the lower face is likely to attract spat far more than a polished plastic surface, which spat has a considerably reduced chance of survival as cement grout adhering to the lower base is poorly keyed and thus is likely to fall off and contaminate the upper face of the adjacent lower cultch. If dipping is used, an alternative base as described with reference to FIG. 8 is preferable to reduce chances of contamination as above.

The float 13 is secured to the cultch assembly with the rope 16 after coating to reduce the chances of the float becoming contaminated with cement. The grout-coated cultch is then secured to similar coated cultches and floated in rafts. Alternatively the grout coated cultches can be stacked into intertidal racks in which the cultches are positioned between high and low tide on a relatively level portion of the shore. If intertidal racks are to be used the cultches can be hung from upper horizontal members of racks, (not shown). Alternatively a steel rod can be substituted for the rope 16, the rod being secured generally vertically by suitable anchoring means (not shown) or the rod can extend from a heavy base resting on the shore. Whichever means of supporting the assembly is used the height of the stack is easily adjustable to the desired height by adding or subtracting individual cultches from the assembly. In all arrangements the grout-coated cultches have a specific gravity somewhat greater than 1.0 so as to sink if not supported by floats or on rods etc. If the coated cultches are damaged in a storm and break free from the raft etc. and lose the coating, they have a specific gravity less than 1.0 and thus float facilitating salvage.

The cultches are placed in a suitable area in time for spat fall so that the spat collects on the grout coated upper surfaces, a typical spat growing after a few months to a larval oyster 117 shown in FIG. 5. When the larvae have grown to a suitable size the cultches are removed and the grout flakes are separated from the cultch by vibration, or by bending of the base to a bent position 118, shown in broken outline in FIG. 5, or a combination of both bending and vibration. Separation as above produces a plurality of diamond shaped grout flakes most of which contain, hopefully, one or more oyster larvae. There is usually some loss of larvae, for instance larvae growing across a ridge, so that breaking of adjacent flakes might break such larvae. However there is the likelihood that most of the larvae will survive the breakup of the cement flakes, and larval mortality is likely to be considerably reduced from the normal mortality associated in breaking up of other artificial cultches, such as the cement-coated egg boxes or wood veneer cultches.

A particular advantage of the grout flake 109 is that it has apparent self-righting tendencies when falling through water, which tendency is not destroyed by a larval oyster of 2–3 months. When the typical flake 109 having the larval oyster 117 is dropped into water above permanent oyster beds, the flake falls through the water rotating as shown by an arrow 119 until it assumes an upright position in which the larval oyster 117 is on an uppermost surface of the flake. Thus when the flake lands on the sea bed 120 the larval oyster is on the uppermost surface as shown in FIG. 7. In this way, assuming negligible disturbance by subsequent tide action, the larval oyster has a good chance of growing without suffocating, or growing in a deformed shape due to overcrowding from adjacent larval oysters. The cultches from which the flakes have been separated can now be cleaned and re-coated with grout for re-use.

ALTERNATIVES AND EQUIVALENTS

FIG. 8

An alternative base 125 of an alternative cultch (not shown) has a first or upper face 127 and a second or lower face 128. A plurality of ridges, two shown only and designated 131 and 132 extend from the upper face 127 and a similar plurality of ridges, two being shown only and designated 133 and 134 extend from the lower face 128. The ridges are similar to the ridges 98 and 99 of FIG. 5 and intersect similar intersecting ridges 135 and 136. All the ridges are disposed so that a ridge on one side of the base has a corresponding ridge extending from an opposite face of the base. The ridges thus define on each side of the base opposed recesses 138 and 139, thus doubling area available for coating with cement grout, and correspondingly collecting spat.

A portion of the base between each opposed pair of recesses has a connecting bore 141 extending therethrough, the bore having sidewalls 143 and 144 converging inwardly to a central plane 145. Thus the bore appears as a convergent-divergent passage having two conical faces. When both faces of the base are coated with cement grout, the passage fills and sets, thus producing a core of cement grout connecting two flakes, (not shown) contained in the recesses 138 and 139 on each side of the face. The core is weakened at the central plane 145 and thus, when the base is vibrated or bent for separation, the core will tend to facture through the plane 145. Thus when the core is fractured two separate flakes are produced, each flake having a short frustro-conical stub (not shown) extending from lower faces thereof.

The arrangement as above doubles the potential collecting area for spat and provides keying of grout coated on the lower face of cultches, thus permitting dipping or non-selective spraying of cultches.

The ridges define diamond-shaped recesses which produce 60°/120° diamond-shaped flakes when filled with cement grout. Flakes of other shapes can be produced from complementary recesses, for example circular flakes, square flakes, hexagonal, etc. Many shapes function effectively provided they are symmetrical, i.e., regular polygons or circular, and have bevelled edges as shown for the diamond-shaped flake 107. The bevelled edges can be inclined to the outer face of the flake at any angle between about 75° and 30°, but the angles for any particular flake are to be essentially equal. Optimum angles for the self-righting tendency of falling flakes can be found by simple experimentation.

I claim:

1. An artificial oyster cultch for collecting oyster spat, the cultch being adapted for use with similar cultches to form a cultch assembly, the cultch including:
   a. a generally plane flexible base having; first and second faces, an edge defining a periphery of the base, and a bore,
   b. a grid of intersecting ridges disposed on both faces of the base, the ridges being disposed so that a ridge extending from one face of the base has a corresponding ridge extending from an opposite face of the base, the ridges on each face defining opposed recesses disposed on either face of the base, the base of each recess having a connecting bore extending therethrough, the ridges extending outwardly from the face of the base a distance defining depth of the recesses.

2. An artificial cultch as claimed in claim 1 further including:

c. a spacer extending from one face, the spacer having inner and outer ends, the inner end being adjacent the first face and the outer end adapted to contact an opposed second face of an adjacent cultch to maintain separation between opposed faces of adjacent cultches when assembled.

3. An artificial cultch as claimed in claim 2 in which:

i. the spacer is a projection having a longitudinal bore, the longitudinal bore of the spacer being aligned with the bore of the base, both bores accepting the connecting member to pass therethrough for securing cultches together to form an assembly.

4. An artificial cultch as claimed in claim 3 in which a portion of the second face of the base adjacent the inner end of the spacer has a complementary recess having a size sufficient to accept an outer end of a similar spacer of an adjacent cultch, so that when the bores of adjacent cultches are aligned the outer end of the spacer of one cultch can engage a complementary recess of an adjacent cultch.

5. An artificial oyster cultch for collecting oyster spat, the cultch being adapted for use with similar cultches to form a cultch assembly, the cultch including:

a. a generally plane flexible base having; first and second faces, an edge defining a circular periphery of the base, and a central bore, b. a grid of intersecting ridges provided on one face of the base, the ridges having sidewalls to define in part and enclose a plurality of recesses, the ridges extending outwardly from the base a distance defining depth of the recesses, c. a hollow cylinder extending from the first face of the base, the cylinder having longitudinal bore generally aligned with the central bore of the base so that both bores can accept a connecting member, the cylinder having inner and outer ends, the inner end being adjacent to the first face of the base and the outer end having an outer diameter, d. a portion of the second face of the base adjacent to the central bore has a circular recess having a diameter sufficient to accept an outer end of a similar hollow cylinder extending from an adjacent cultch, e. a plurality of spaced peripheral spacers extend from one face adjacent the periphery of the base, so that when the bores of adjacent cultches are aligned, the outer end of the cylinder of one cultch can engage a complementary recess of an adjacent cultch to maintain separation between opposed faces of adjacent cultches when assembled, thus serving as a spacer, and the connecting member can pass through both bores for securing cultches together to form an assembly.

6. An artificial cultch as claimed in claim 5 in which the ridges have outwardly converging sidewalls so as to define recesses having outwardly diverging sidewalls.

7. An artificial cultch as claimed in claim 1 in which:

i. the peripheral spacers are hollow having central bores,
ii. the base has peripheral bores coincident with the central bores of the peripheral spacers to accept connecting members threaded therethrough.

8. An artificial cultch as claimed in claim 1 in which the central spacer and peripheral spacers extend from the same face of the base.

9. An artificial cultch as claimed in claim 5 in which the grid has:

i. a first set of spaced parallel ridges extending across the base,
ii. a second set of spaced parallel ridges extending across the base, the first set of ridges intersecting the second set at approximately 60°, thus forming a plurality of diamond-shaped recesses.

10. An artificial cultch as claimed in claim 5 in which:

i. both faces of the base have grids of intersecting ridges, the ridges being disposed so that a ridge one side of the face has a corresponding ridge extending from opposite side of the face, the ridges on each side defining opposed recesses disposed on either side of the base, the base of each recess having a connecting bore extending therethrough.

11. An artificial cultch as claimed in claim 10 in which:

i. the peripheral spacers are hollow having central bores,
ii. the base has peripheral bores coincident with the central bores of the peripheral spacers to accept connecting members threaded therethrough, so as to secure peripheries of the bases together.

12. An artificial cultch as claimed in claim 11 in which:

a portion of a face of the base adjacent each peripheral spacer and on a face of the base remote from the spacer has a recess aligned with the bore of the particular peripheral spacer, the recess having a size to accept an outer end of an adjacent peripheral spacer of an adjacent cultch, so that when the cultches are assembled outer ends of the peripheral spacers are engaged in recesses of an adjacent cultch.

* * * * *